United States Patent
Tomikawa

(10) Patent No.: US 10,884,294 B1
(45) Date of Patent: Jan. 5, 2021

(54) ELECTRO-OPTICAL DEVICE AND ELECTRONIC APPARATUS

(71) Applicant: SEIKO EPSON CORPORATION, Tokyo (JP)

(72) Inventor: Naoki Tomikawa, Fujimi-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/897,730

(22) Filed: Jun. 10, 2020

(30) Foreign Application Priority Data

Jun. 11, 2019 (JP) ................... 2019-108501

(51) Int. Cl.
| G02F 1/1339 | (2006.01) |
| G02F 1/1333 | (2006.01) |
| G02F 1/1335 | (2006.01) |
| G02F 1/1343 | (2006.01) |

(52) U.S. Cl.
CPC ........ *G02F 1/1339* (2013.01); *G02F 1/13439* (2013.01); *G02F 1/133345* (2013.01); *G02F 1/133512* (2013.01); *G02F 2001/13398* (2013.01)

(58) Field of Classification Search
CPC ............. G02F 1/1339; G02F 1/133345; G02F 1/13439; G02F 1/133512; G02F 2001/13398
See application file for complete search history.

(56) References Cited

U.S. PATENT DOCUMENTS

| 2005/0128367 A1* | 6/2005 | Hoke ................. G02F 1/1341 349/1 |
| 2017/0139289 A1 | 5/2017 | Asozu |
| 2017/0176788 A1 | 6/2017 | Fukuoka et al. |

FOREIGN PATENT DOCUMENTS

| JP | 2007-279172 A | 10/2007 |
| JP | 2007-316119 A | 12/2007 |
| JP | 2008-020725 A | 1/2008 |
| JP | 2009-092697 A | 4/2009 |
| JP | 2017-090794 A | 5/2017 |
| JP | 2017-111290 A | 6/2017 |

* cited by examiner

Primary Examiner — Phu Vu
(74) Attorney, Agent, or Firm — JCIPRNET

(57) ABSTRACT

In an electro-optical device, a first ion trap electrode, a second ion trap electrode, and a third ion trap electrode are provided between a pixel region and a sealing material, the first ion trap electrode, the second ion trap electrode, and the third ion trap electrode are applied with signals whose phases are shifted by 120° from each other. Since a diffusion preventing portion in which the thickness of an electro-optical layer is thinner than the thickness of the pixel region is provided between a pixel electrode and the first ion trap electrode, ionic impurities are less likely to diffuse into the pixel region even if application of a potential to an ion trap electrode is paused.

9 Claims, 12 Drawing Sheets

ELECTRO-OPTICAL DEVICE AND ELECTRONIC APPARATUS

The present application is based on, and claims priority from JP Application Serial Number 2019-108501, filed Jun. 11, 2019, the disclosure of which is hereby incorporated by reference herein in its entirety.

BACKGROUND

1. Technical Field

The present disclosure relates to an electro-optical device and an electronic apparatus.

2. Related Art

An electro-optical device such as a liquid crystal device includes a first substrate and a second substrate bonded to the first substrate via a sealing material, and the electro-optical layer such as the liquid crystal layer is disposed on an inner side of the sealing material. In the electro-optical device, when ionic impurities of the liquid crystal layer are unevenly distributed in a pixel region, optical modulation characteristics decrease in a region where the ionic impurities are unevenly distributed.

On the other hand, when the liquid crystal layer is disposed on the inner side of the sealing material in a dropping manner, in order to prevent the ionic impurities from diffusing into the display region, the ionic impurities elute from the sealing material before curing to the liquid crystal layer, a configuration in which a trap electrode is provided between the display region and the sealing material, and a wall is provided between the trap electrode and the display region is disclosed (see JP-A-2017-111290). In addition, a configuration that walls are provided on the inner side of the sealing material and between the sealing material and the display region, and electrodes are provided on each of these walls to trap the impurity ions (see JP-A-2017-90794).

Since it is difficult to avoid the ionic impurities from mixing into the liquid crystal layer of the display region, in order to suppress the influence of the ionic impurities on the quality of an image, it is effective to sweep the ionic impurities from the display region to the outside of the display region by the ion trap electrode. However, even if the ionic impurities are trapped by the potential applied to the ion trap electrode, when the application of the potential to the ion trap electrode is paused, high-concentration ionic impurities condensed near the ion trap electrode will diffuse into the display region due to a concentration difference of the ionic impurities between the ion trap electrode and the display region. Therefore, there is a problem that it is necessary to efficiently sweep the ionic impurities from the display region to the outer side of the display region by the ion trap electrode, and to suppress a diffusion of the ionic impurities to the display region when the application of the potential to the ion trap electrode is paused.

However, in the configuration described in JP-A-2017-111290, since an advantage of some aspects of the disclosure is retaining the ionic impurities between the sealing material and the display region, the ionic impurities elute from the sealing material before curing to the liquid crystal layer, the liquid crystal layer between the sealing material and the display region is extremely thin due to the wall. Therefore, it is difficult to efficiently sweep the ionic impurities from the display region to the outer side of the display region.

In addition, in the configuration described in JP-A-2017-90794, since an electrode for trapping is provided on the wall, when the application of the potential to the ion trap electrode is paused, it is difficult to suppress the high-concentration ionic impurities condensed near the ion trap electrode from diffusing into the display region due to the concentration difference of the ionic impurities between the ion trap electrode and the display region.

SUMMARY

In order to solve the problems, an aspect of the electro-optical device according to the present disclosure includes: a first substrate; a second substrate bonded to the first substrate via a sealing material; an electro-optical layer disposed on an inner side of the sealing material; a plurality of pixel electrodes provided in a pixel region of one of the first substrate and the second substrate; a first ion trap electrode provided between the pixel region of the first substrate and the sealing material, the first ion trap electrode being applied with a first signal; a second ion trap electrode provided between the first ion trap electrode of the first substrate and the sealing material, the second ion trap electrode being applied with a second signal having a phase different from the first signal, wherein a diffusion preventing portion is provided in a position between the plurality of pixel electrodes and the first ion trap electrode such that a thickness of the electro-optical layer in the position is thinner than that in the pixel region.

Another aspect of the electro-optical device according to the present disclosure includes: a first substrate; a second substrate bonded to the first substrate via a sealing material; an electro-optical layer disposed on an inner side of the sealing material; a plurality of pixel electrodes provided in a pixel region of one of the first substrate and the second substrate, wherein the plurality of pixel electrodes include an image display pixel electrode in which an image signal for displaying an image is applied to the pixel electrode and an ion trap electrode to which an ion trap signal having a phase different from that of the image signal is applied, a diffusion preventing portion is provided in a position between the image display pixel electrode and the ion trap electrode, the diffusion preventing portion being provided such that the thickness of the electro-optical layer in the position is thinner than that in a region where the electro-optical layer overlaps the image display pixel electrode.

Another aspect of the electro-optical device according to the present disclosure includes: a first substrate; a second substrate bonded to the first substrate via a sealing material; an electro-optical layer disposed on an inner side of the sealing material; a plurality of pixel electrodes provided in a pixel region of one of the first substrate and the second substrate; and an ion trap electrode provided between the pixel region of the first substrate and the sealing material, the ion trap electrode being applied with an ion trap potential, wherein a diffusion preventing portion is provided in a position between the pixel electrode and the ion trap electrode such that the thickness of the electro-optical layer in the position is thinner than that in the pixel region and thicker than the interval between the pixel electrode and the ion trap electrode in plan view.

The electric device to which the present disclosure is applied may be used in various types of electronic apparatuses such as a direct-view-type display device and a projection-type display device. When an electronic apparatus is applied to a projection-type display device, the projection-type display device includes a light-source unit configured to

DESCRIPTION OF EXEMPLARY EMBODIMENTS

Figure 1:
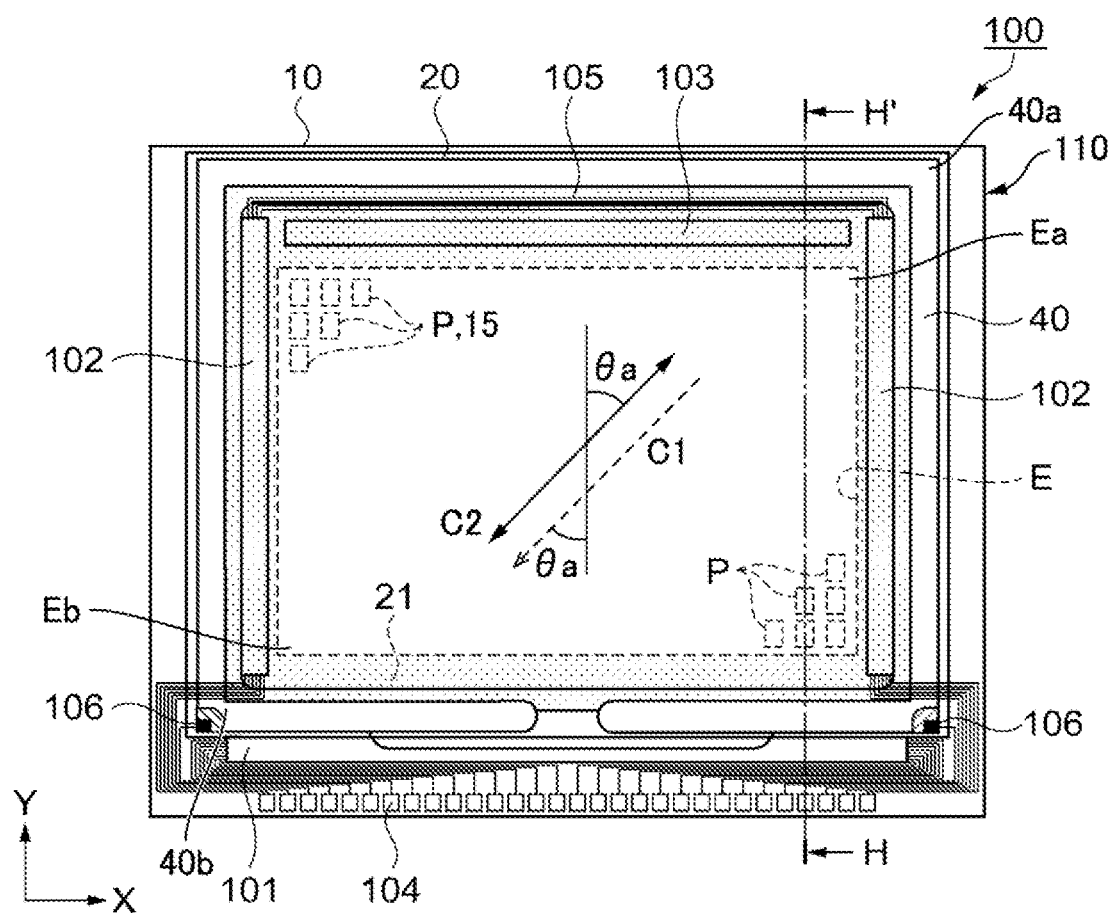
FIG. 1 is an explanatory diagram schematically illustrating a planar configuration of an electro-optical device according to exemplary embodiment 1 of the present disclosure.

Exemplary embodiments of the present disclosure will be described below with reference to the accompanying drawings. Note that in the drawings referred to below, parts described are illustrated in an enlarged or reduced state as appropriate, so that those parts can be easily recognized. Further, in the description below, when describing films or the like formed on a first substrate 10, an upper layer refers to a side opposite to a substrate body 10w of the first substrate 10, and a lower layer refers to a side of the substrate body 10w. When describing films or the like formed on a second substrate 20, the upper layer refers to a side opposite to a substrate body 20w of the second substrate 20, and the lower layer refers to a side of the substrate body 20w. Further, a plan view means a state as viewed from a normal direction with respect to the first substrate 10 and the second substrate 20. In addition, in the description below, as an example of a transistor, an active matrix type electro-optical device 100, which is provided with a thin film transistor (a TFT) 30 as a pixel switching element, will be mainly described. The electro-optical device 100 can be used favorably as light modulation means (liquid crystal light valve) or the like of a projection-type display device (liquid crystal projector) described below.

First Exemplary Embodiment

Figure 2:
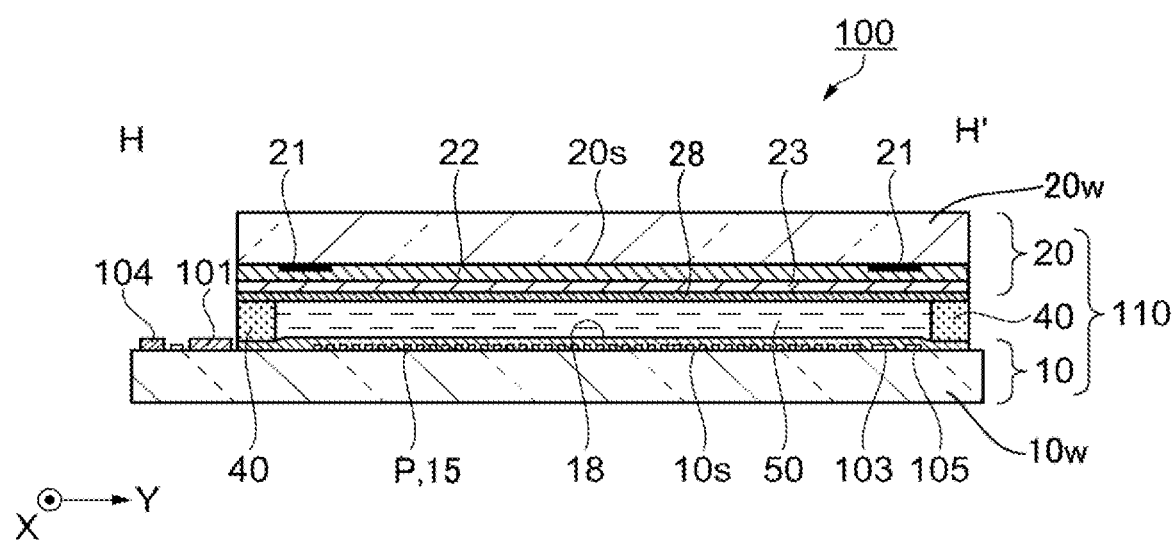
FIG. 2 is a cross-sectional view schematically illustrating an H-H' cross-section of the electro-optical device illustrated in FIG. 1.

FIG. 1 is an explanatory diagram schematically illustrating a planar configuration of an electro-optical device 100 according to exemplary embodiment 1 of the present disclosure. FIG. 2 is a cross-sectional view schematically illustrating an H-H' cross-section of the electro-optical device 100 illustrated in FIG. 1. The electro-optical device 100 illustrated in FIG. 1 and FIG. 2 is a liquid crystal device and includes a liquid crystal panel 110. The electro-optical device 100 includes the first substrate 10 and the second substrate 20 opposite to the first substrate 10, and the first substrate 10 and the second substrate 20 are bonded via a frame-shaped sealing material 40. An electro-optical layer 50 including a liquid crystal layer is disposed on the inner side of the sealing material 40 between the first substrate 10 and the second substrate 20. The first substrate 10 includes a substrate body 10w having a light-transmissive substrate such as a quartz substrate and a glass substrate. The second substrate 20 includes a substrate body 20w having a light-transmissive substrate such as a quartz substrate and a glass substrate, the region from the substrate body 20w to a second alignment film 28 corresponds to the second substrate 20.

The first substrate 10 is larger than the second substrate 20, and the sealing material 40 is disposed along an outer edge of the second substrate 20. The liquid crystal layer includes a liquid crystal material having positive or negative dielectric anisotropy in the electro-optical layer 50. The sealing material 40 is formed from an adhesive such as a thermosetting or ultraviolet-curable epoxy resin, and includes a spacer (not illustrated) for maintaining a constant spacing between the first substrate 10 and the second substrate 20.

A pixel region E is provided in a region surrounded by the sealing material 40, and a plurality of pixels P are arranged in a matrix manner in the pixel region E. The second substrate 20 is provided with a demarcation portion 21 provided between the sealing material 40 and the pixel region E to surround the periphery of the pixel region E. The demarcation portion 21 is configured by a light shielding layer made from metal, metal oxide, or the like. Although not illustrated, the light-shielding layer may be configured as a black matrix that overlaps with boundary portions of the adjacent pixels P in plan view, with respect to the second substrate 20.

In the first substrate 10, on a side of one surface 10s of the substrate body 10w, which opposite to the second substrate 20, a plurality of terminals 104 are arranged on the outer side of the sealing material 40 along one side, and a data line driving circuit 101 is provided between the terminals 104 and the pixel region E. On the side of the one surface 10s of the substrate body 10w, a scanning line driving circuit 102 is provided on the outer side of the pixel region E along each of two sides adjacent to the side on which the terminals 104 are arranged, and an inspection circuit 103 is provided along a side opposite to the side on which the terminals 104 are arranged. On the side of the one surface 10s of the substrate body 10w, a plurality of wiring lines 105 that couple the two scanning line driving circuits 102 are provided between the sealing material 40 and the inspection circuit 103. The data line driving circuit 101 and each of the plurality of wiring lines 105 coupled to the scanning line driving circuits 102 are coupled to the plurality of terminals 104. Hereinafter, a direction in which the terminals 104 are arranged is referred to as an X-axis direction, and a direction orthogonal to the X-axis direction is referred as the Y-axis direction. Note that the inspection circuit 103 may be provided between the data line driving circuit 101 and the pixel region E.

A pixel electrode 15 arranged for each of the plurality of pixels P and a first alignment film 18 covering the pixel electrodes 15 are provided on the side of the one surface 10s of the substrate body 10w. In addition, although not illustrated, a pixel switching element, wiring lines, and the like, which will be described below, are provided on the side of the one surface 10s of the substrate body 10w. The pixel electrode 15 is formed from a light-transmissive conductive film, such as indium tin oxide (ITO).

In the second substrate 20, the demarcation portion 21, a flattening film 22 covering the demarcation portion 21, a common electrode 23 covering the flattening film 22, and the second alignment film 28 covering the common electrode 23 are provided on the side of the one surface 20s side of the substrate body 20w that opposite to the first substrate 10. In a plan view, the demarcation portion 21 surrounds the pixel region E and overlaps with the scanning line driving circuit 102 and the inspection circuit 103. Therefore, an erroneous operation due to light is prevented by shielding light that may be incident on the scanning line driving circuit 102 and the like from the second substrate 20 side. In addition, the demarcation portion 21 prevents unwanted stray light from being incident on the pixel region E to enhance the contrast of the displayed image. The flattening film 22 is formed from an inorganic material, such as silicon oxide, for example.

The common electrode 23 is formed from a light-transmissive conductive film, such as ITO, and is electrically coupled to a vertical conduction portion 106 provided between the first substrate 10 and the second substrate 20. The vertical conduction portion 106 is electrically coupled to the terminals 104 via wiring lines provided on the first substrate 10.

The first alignment film 18 and the second alignment film 28 are selected based on an optical design of the electro-optical device 100. The first alignment film 18 and the second alignment film 28 are formed from an inorganic alignment film containing an inorganic material, such as silicon oxide (SiOx) formed by a vapor-phase growth method, and aligns liquid crystal molecules having negative dielectric anisotropy to be substantially vertical. The first alignment film 18 and the second alignment film 28 may be formed from an organic alignment film, such as polyimide having a surface that has been rubbed, and the organic alignment film aligns liquid crystal molecules having positive dielectric anisotropy to be substantially horizontal.

The electro-optical device 100 according to the exemplary embodiment is a transmissive type, and is configured as a liquid crystal device in a normally-white mode in which the transmittance of the pixel P is maximized in a voltage not applied state or in a normally-black mode in which the transmittance of the pixel P is minimum in a voltage not applied state, depending on the optical design of each of the polarization elements disposed on the light incident side and the light-emitting side with respect to the liquid crystal panel 110. In the exemplary embodiment, an example is described in which the optical design of the normally-black mode is applied, using the inorganic alignment films as the first alignment film 18 and the second alignment film 28, and using the liquid crystal material having the negative dielectric anisotropy for the electro-optical layer 50.

Electrical Configuration

Figure 3:
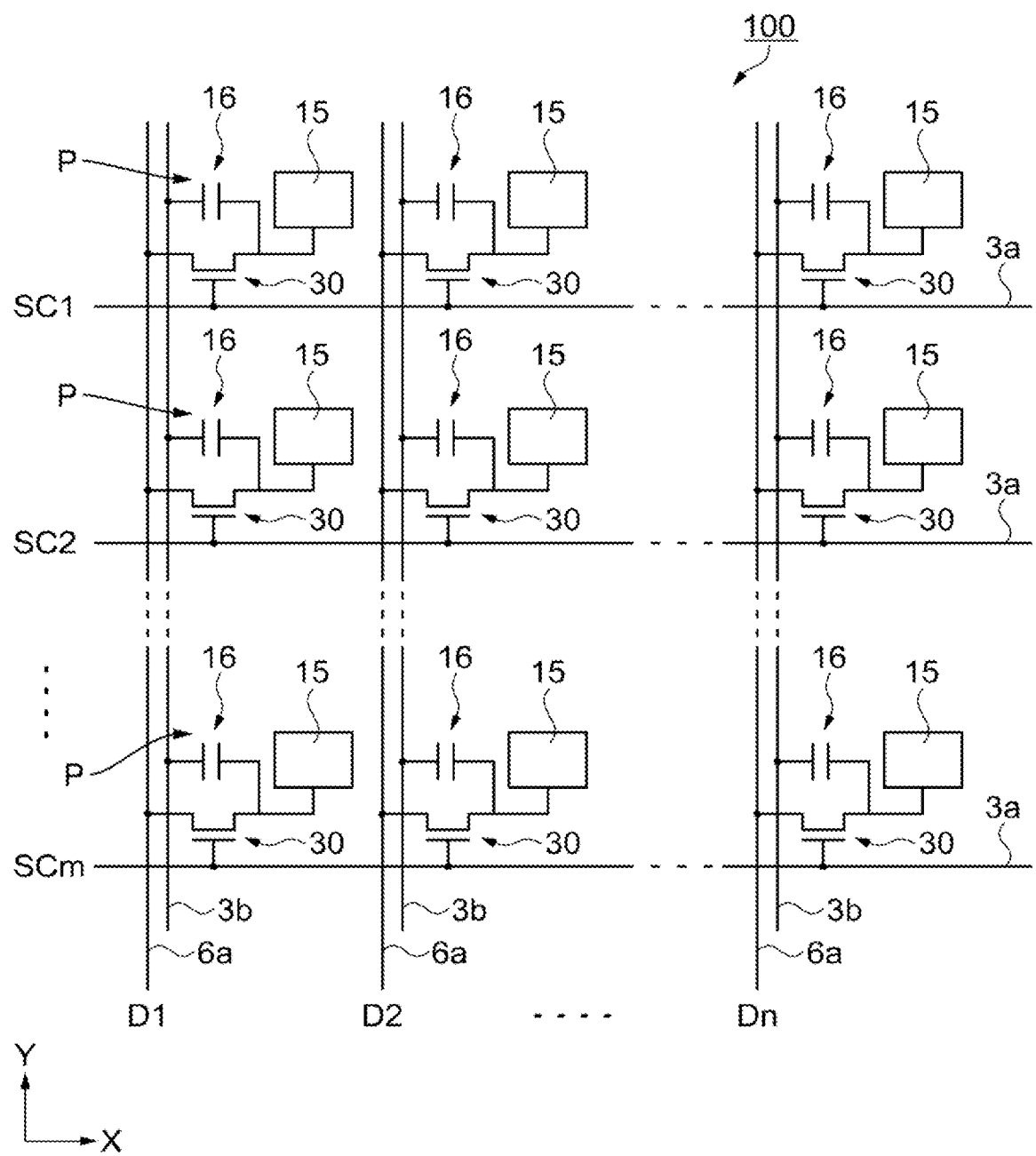
FIG. 3 is an equivalent circuit diagram illustrating an electrical configuration of the electro-optical device illustrated in FIG. 1.

FIG. 3 is an equivalent circuit diagram illustrating an electrical configuration of the electro-optical device 100 illustrated in FIG. 1. As illustrated in FIG. 3, the electro-optical device 100 includes at least a plurality of scanning lines 3a extending in the X-axis direction in the pixel region E, and a plurality of data lines 6a extending in the Y-axis direction, the scanning line 3a and the data line 6a are in an insulated state from each other in the first substrate 10. In the exemplary embodiment, the first substrate 10 includes capacitor lines 3b that extend along the data lines 6a. In addition, the pixel P is provided to correspond to each of intersections between the plurality of scanning lines 3a and the plurality of data lines 6a. Each of the plurality of pixels P includes the pixel electrode 15, the TFT 30, and a storage capacitor 16. The scanning line 3a is electrically coupled to a gate of the TFT 30, and the data line 6a is electrically coupled to a source of the TFT 30. The pixel electrode 15 is electrically coupled to a drain of the TFT 30.

The data lines 6a are coupled to the data line driving circuit 101 illustrated in FIG. 1, and supply image signals D1, D2, . . . , and Dn supplied from the data line driving circuit 101 to the each pixel P. The scanning lines 3a are coupled to the scanning line driving circuit 102 illustrated in FIG. 1, and sequentially supply scanning signals SC1, SC2, . . . , and SCm supplied from the scanning line driving circuit 102 to the each pixel P. The image signals D1 to Dn supplied from the data line driving circuit 101 to the data lines 6a may be line-sequentially supplied in this order, or may be supplied to the plurality of data lines 6a adjacent to one another for each group. The scanning line driving circuit 102 line-sequentially supplies the scan signals SC1 to SCm to the scanning lines 3 at predetermined timings.

In the electro-optical device 100, during a period in which the TFT 30, which is a switching element, is turned on by an input of the scanning signals SC1 to SCm, the image signals D1 to Dn supplied from the data lines 6a are written into the pixel electrodes 15 at predetermined timings. The image signals D1 to Dn of a predetermined level written into the electro-optical layer 50 via the pixel electrodes 15 are maintained for a certain period between the pixel electrodes 15 and the common electrode 23, which are arranged to face the pixel electrodes 15 being intervened by the electro-optical layer 50. The frequency of the image signals D1 to Dn is 60 Hz, for example. In the exemplary embodiment, to inhibit the image signals D1 to Dn maintained between the pixel electrodes 15 and the electro-optical layer 15 from leaking, the storage capacitor 16 is coupled in parallel with a liquid crystal capacitor formed between the pixel electrode 15 and the common electrode 23. The storage capacitor 16 is provided between the drain of the TFT 30 and the capacitor line 3b.

The data lines 6a are coupled to the inspection circuit 103 illustrated in FIG. 1, and the inspection circuit 103 is used to verify operational defects and the like of the electro-optical device 100 by detecting the above-described image signals in a manufacturing process of the electro-optical device 100. Therefore, in FIG. 3, an illustration of the inspection circuit 103 is omitted. Note that in FIG. 1, the data line driving circuit 101, the scanning line driving circuit 102, and the inspection circuit 103 is illustrated as peripheral circuits formed on the outer side of the pixel region E. However, a sampling circuit that is configured to sample the above-described image signals and supply the sampled image signals to the data lines 6a, a pre-charge circuit that is configured to supply pre-charge signals of a predetermined voltage level to the data lines 6a in advance of the above-described image signals D1 to Dn, and the like may be provided as the peripheral circuits in some cases.

Configuration of Pixel P

Figure 4:
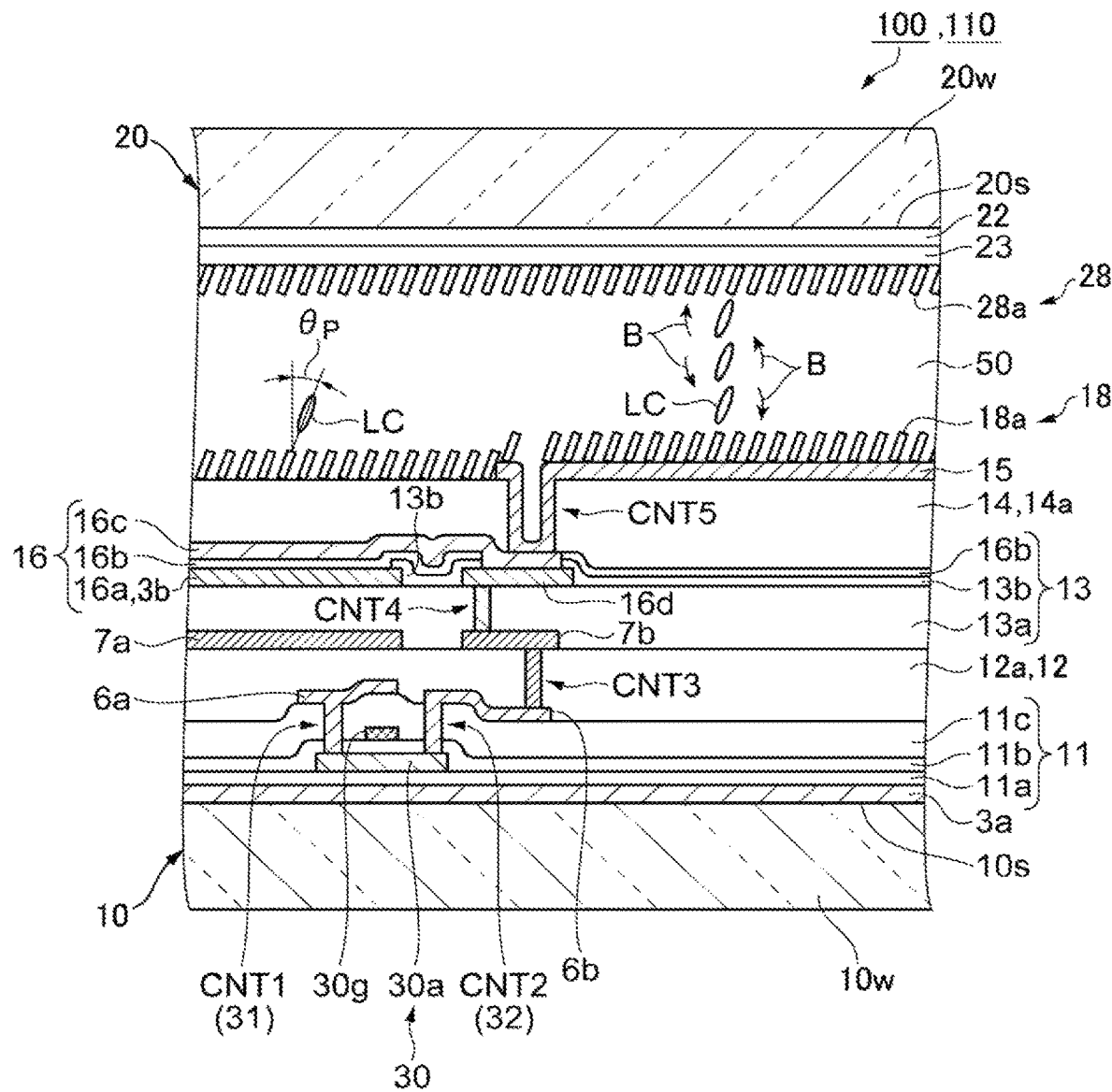
FIG. 4 is a cross-sectional view schematically illustrating a structure of a pixel illustrated in FIG. 3.

FIG. 4 is a cross-sectional view schematically illustrating a structure of the pixel P illustrated in FIG. 3. As illustrated in FIG. 4, in the first substrate 10, the scanning line 3a is formed on the one surface 10s of the substrate body 10w. The scanning line 3a is formed by a light shielding layer such as aluminum (Al), titanium (Ti), chromium (Cr), tungsten (W), tantalum (Ta), molybdenum (Mo), or the like.

A first insulating film 11a (base insulating film) made of silicon oxide or the like is formed on the upper layer of the scanning line 3a, and a semiconductor layer 30a is formed on the upper layer of the first insulating film 11a. The semiconductor layer 30a is formed by a polycrystalline silicon film. The semiconductor layer 30a is covered with a second insulating film (gate insulating film) 11b made of silicon oxide or the like, and a gate electrode 30g electrically coupled to the scanning line 3a is formed on the upper layer of the second insulating film lib.

A third insulating film 11c made of silicon oxide or the like is formed on the upper layer of the gate electrode 30g. In the second insulating film 11b and the third insulating film 11c, contact holes CNT1 and CNT2 extending to the source area and the drain area of the semiconductor layer 30a are formed. The data line 6a (a source electrode) coupled to the semiconductor layer 30a through the contact holes CNT1 and CNT2, and a first relay electrode 6b (a drain electrode) are formed on upper layer of the third insulating film 11c. The TFT 30 is configured in this manner. In the exemplary embodiment, the TFT 30 has a lightly doped drain (LDD) structure.

A first interlayer insulating film 12a formed of silicon oxide or the like is formed on the upper layer side of the data line 6a and the first relay electrode 6b. The surface of the first interlayer insulating film 12a is flattened by chemical mechanical polishing (CMP) processing or the like. A contact hole CNT3 extending to the first relay electrode 6b is formed in the first interlayer insulating film 12a, and a wiring line 7a and a second relay electrode 7b electrically coupled to the first relay electrode 6b through the contact hole CNT3 are formed on upper layer of the first interlayer insulating film 12a. The wiring line 7a is formed to overlap with the semiconductor layer 30a of the TFT 30 and the data line 6a in a plan view, and functions as a shield layer to which a fixed potential is applied.

A second interlayer insulating film 13a formed of silicon oxide or the like is formed on the upper layer side of the wiring line 7a and the second relay electrode 7b. The surface of the second interlayer insulating film 13a is flattened by the CMP processing or the like. A contact hole CNT4 extending to the second relay electrode 7b is formed in the second interlayer insulating film 13a.

Using a light shielding metal or the like, a first capacitor electrode 16a and a third relay electrode 16d are formed on upper layer of the second interlayer insulating film 13a. The first capacitor electrode 16a is the capacitor line 3b formed to extend across the plurality of pixels P, and a fixed potential is supplied to the first capacitor electrode 16a. An insulating film 13b is formed on upper layer of the first capacitor electrode 16a and the third relay electrode 16d, to cover an outer edge of the first capacitor electrode 16a, an outer edge of the third relay electrode 16d, and the like. A dielectric layer 16b is formed on the upper layer side of the first capacitor electrode 16a and the insulating film 13b. The dielectric layer 16b is formed by a silicon nitride film, hafnium oxide (HfO$_2$), alumina (Al$_2$O$_3$), tantalum oxide (Ta$_2$O$_5$), or the like. A second capacitor electrode 16c formed of titanium nitride (TiN) or the like is formed on the upper layer of the dielectric layer 16b, and the storage capacitor 16 is configured by the first capacitor electrode 16a, the dielectric layer 16b, and the second capacitor electrode 16c. The second capacitor electrode 16c is electrically coupled to the third relay electrode 16d through a removed portion of the dielectric layer 16b and the insulating film 13b.

A fourth interlayer insulating film 14a formed of silicon oxide or the like is formed on the upper layer side of the second capacitor electrode 16c, and the surface of the fourth interlayer insulating film 14a is flattened by the CMP processing or the like. A contact hole CNT5 extending to the second capacitor electrode 16c is formed in the fourth interlayer insulating film 14a. The pixel electrodes 15 formed by a light-transmissive conductive film such as ITO are formed on upper layer of the fourth interlayer insulating film 14a, and the pixel electrodes 15 are electrically coupled to the second capacitor electrode 16c through the contact hole CNT5.

In the electro-optical device 100 configured in this manner, a plurality of wiring lines are formed on the first substrate 10, and a wiring portion is indicated using reference signs of the insulating films and the interlayer insulating films that perform insulation between the wiring lines. For example, a representative wiring line of the wiring portion 11 is the scanning line 3a. A representative wiring line of a wiring portion 12 is the data line 6a. A representative wiring line of a wiring portion 13 is a wiring line 7 a. A representative wiring line of a wiring portion 14 is the capacitor line 3b serving as the first capacitor electrode 16a.

Configuration of Electro-Optical 50 and the Like

The first alignment film 18 and the second alignment film 28 are the inorganic alignment films, and are respectively formed of an aggregate of columns 18c and 28c, which are obtained by diagonally depositing and growing an inorganic material such as silicon oxide in a columnar shape. Thus, in the electro-optical layer 50, liquid crystal molecules LC have a pre-tilt angle θp of 3° to 5° with respect to the normal direction with respect to the first substrate 10 and the second substrate 20, and are substantially aligned vertically (VA: Vertical Alignment). When a driving signal is applied between the pixel electrodes 15 and the common electrode 23, an inclination of the liquid crystal molecule LC changes in accordance with an electric field direction generated between the pixel electrodes 15 and the common electrode 23.

In FIG. 1, a diagonal deposition direction applied when forming the first alignment film 18 on the first substrate 10 is, for example, a direction indicated by a dashed arrow C1, and is a direction that forms an angle θa in the Y-axis direction. A diagonal deposition direction applied when forming the second alignment film 28 on the second substrate 20 is, for example, a direction indicated by a solid arrow C2, and is a direction that forms the angle θa in the Y-axis direction. The alignment direction of the liquid crystal molecules LC is defined by the deposition direction. The angle θa is 45 degrees, for example. The diagonal deposition direction applied when forming the first alignment film 18 on the first substrate 10 is opposite to the diagonal deposition direction applied when forming the second alignment film 28 on the second substrate 20.

Description of Pixel Region E and the Like

Figure 5:
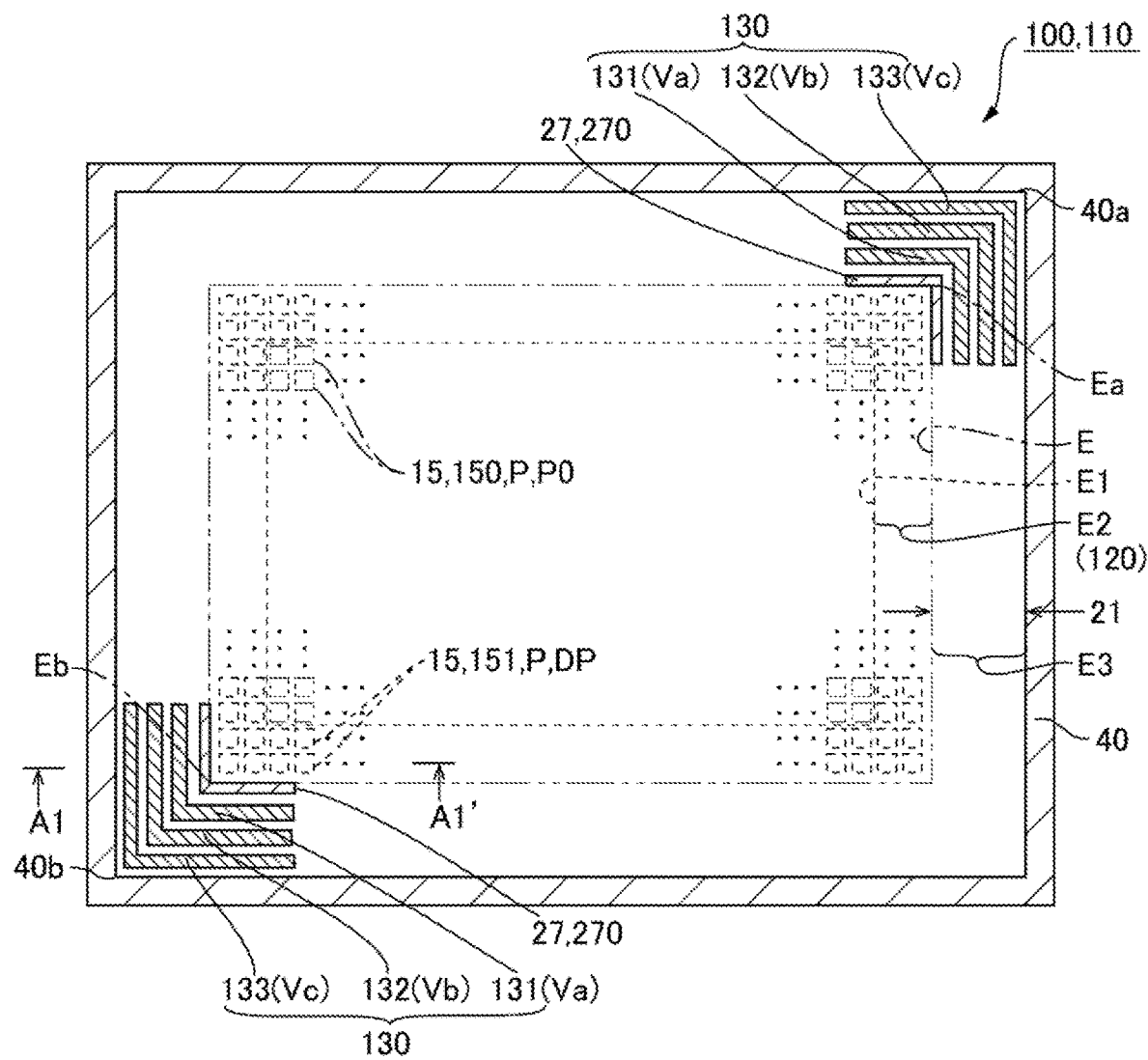
FIG. 5 is an explanatory diagram illustrating a planar configuration of the electro-optical device illustrated in FIG. 1.
Figure 6:
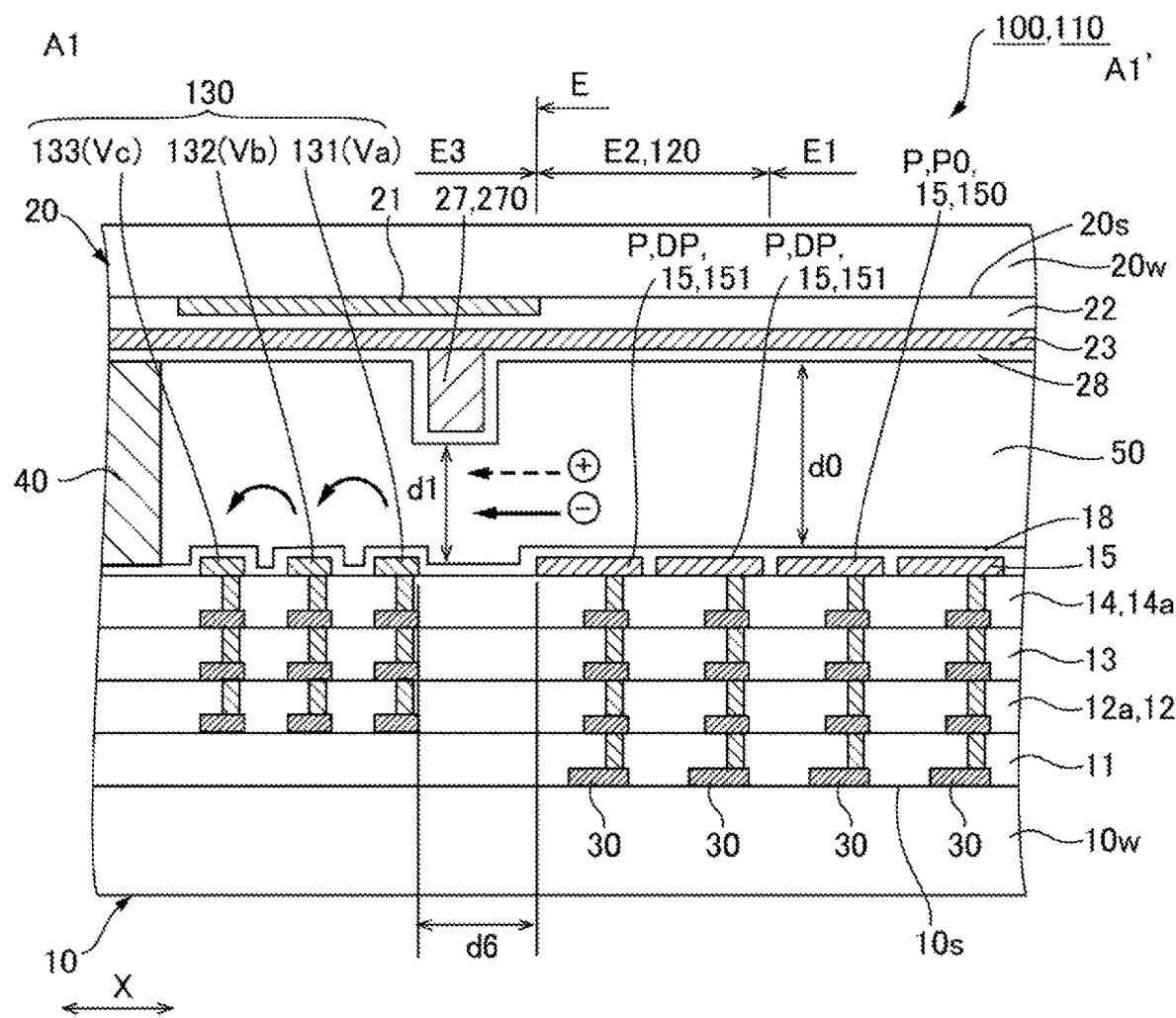
FIG. 6 is an explanatory diagram schematically illustrating an A1-A1' cross-section of the electro-optical device illustrated in FIG. 5.

FIG. 5 is an explanatory diagram illustrating a planar configuration of the electro-optical device 100 illustrated in FIG. 1, and is an explanatory diagram of a region where the first substrate 10 and the second substrate 20 overlap. FIG. 6 is an explanatory diagram schematically illustrating an A1-A1' cross-section of the electro-optical device 100 illustrated in FIG. 5. As illustrated in FIG. 5 and FIG. 6, the plurality of pixels P are arranged in the X-axis direction and the Y-axis direction in the pixel region E of the electro-optical device 100, and each of the plurality of pixels P includes the pixel electrode 15 electrically coupled to the TFT 30. The pixel P and the pixel electrode 15 have the same planar shape, size, arrangement pitch, and the like.

The pixel region E includes a display region E1 in which, of the plurality of pixels P, display pixels P0 that directly contribute to image display are arranged, and, around the display region E1, a dummy pixel region E2 that includes a plurality of dummy pixels DP that do not directly contribute to the image display. In addition, the outer side of the pixel region E is a peripheral region E3. In the following description, of the plurality of pixel electrodes 15, pixel electrodes 15 provided in a display pixel P0 are referred as image display pixel electrode 150, and pixel electrodes 15 provided in a dummy pixel DP are referred as dummy pixel electrodes 151. In the aspect illustrated in FIG. 5, pairs of two dummy pixels DP are disposed in the dummy pixel area E2 with the display area E1 being disposed between each pair of dummy pixels DP in the X-axis direction, and pairs of two dummy pixels DP are disposed with the display area E1 being disposed between each pair of dummy pixels DP in the Y-axis direction. However, the number of dummy pixels DP arranged in the dummy pixel region E2 is not limited to this example, and it is sufficient that at least one pair of the dummy pixels DP is arranged in each of the X-axis direction and the Y-axis direction with the display region E1 interposed between the one pair of the dummy pixels DP. In addition, the number of dummy pixels DP may be three or more, and the number of dummy pixels DP arranged in the X-axis direction and the Y-axis direction may be different.

In the exemplary embodiment, the dummy pixel area E2 functions as an electronic demarcation portion 120. More specifically, each of the dummy pixel electrodes 151 is electrically coupled to the TFT 30 provided on the bottom layer side, and when where the electro-optical device 100 is in the normally-black mode, an alternating potential is constantly applied to the extent that the transmittance of the dummy pixels DP does not change, regardless of the display state of the pixel P of the display region E1. Thus, the entire region of the electronic demarcation unit 120 is black display. Note that the demarcation portion 21 described with reference to FIG. 1 and FIG. 2 is located between the sealing material 40 and the dummy pixel region E2, and hence, the dummy region area E2 (electronic demarcation portion 120) together with the demarcation portion 21 functions as a demarcation that does not depend on the ON and OFF of the electro-optical device 100.

Impurity Ions

In the electro-optical device 100 configured in this manner, when the electro-optical layer 50 is driven, the liquid crystal molecules LC vibrate, as indicated by arrows B in FIG. 4, and a flow of the liquid crystal molecules LC occurs in the diagonal deposition direction indicated by an arrow C1 and an arrow C2 illustrated in FIG. 1. Therefore, when the ionic impurities are included in the electro-optical layer 50 due to mixing during liquid crystal injection or elution from the sealing material 40, the ionic impurities move toward corner portions Ea and Eb of the pixel region E along the flow of the liquid crystal molecules LC, and become unevenly distributed to the corner portions Ea and Eb. In a region where the ionic impurities are unevenly distributed, the insulating resistance of the electro-optical layer 50 deteriorates, which leads to a decrease in driving potential. As a result, display unevenness or an image sticking phenomenon due to energization is generated at the corner portions Ea and Eb.

Therefore, in the exemplary embodiment, as described below, the ion trap electrode 130 is provided on the outer side of the display region E1, and the ionic impurities of the display region E1 is swept out of the display region E1.

Configuration of trap electrode 130

Figure 7:
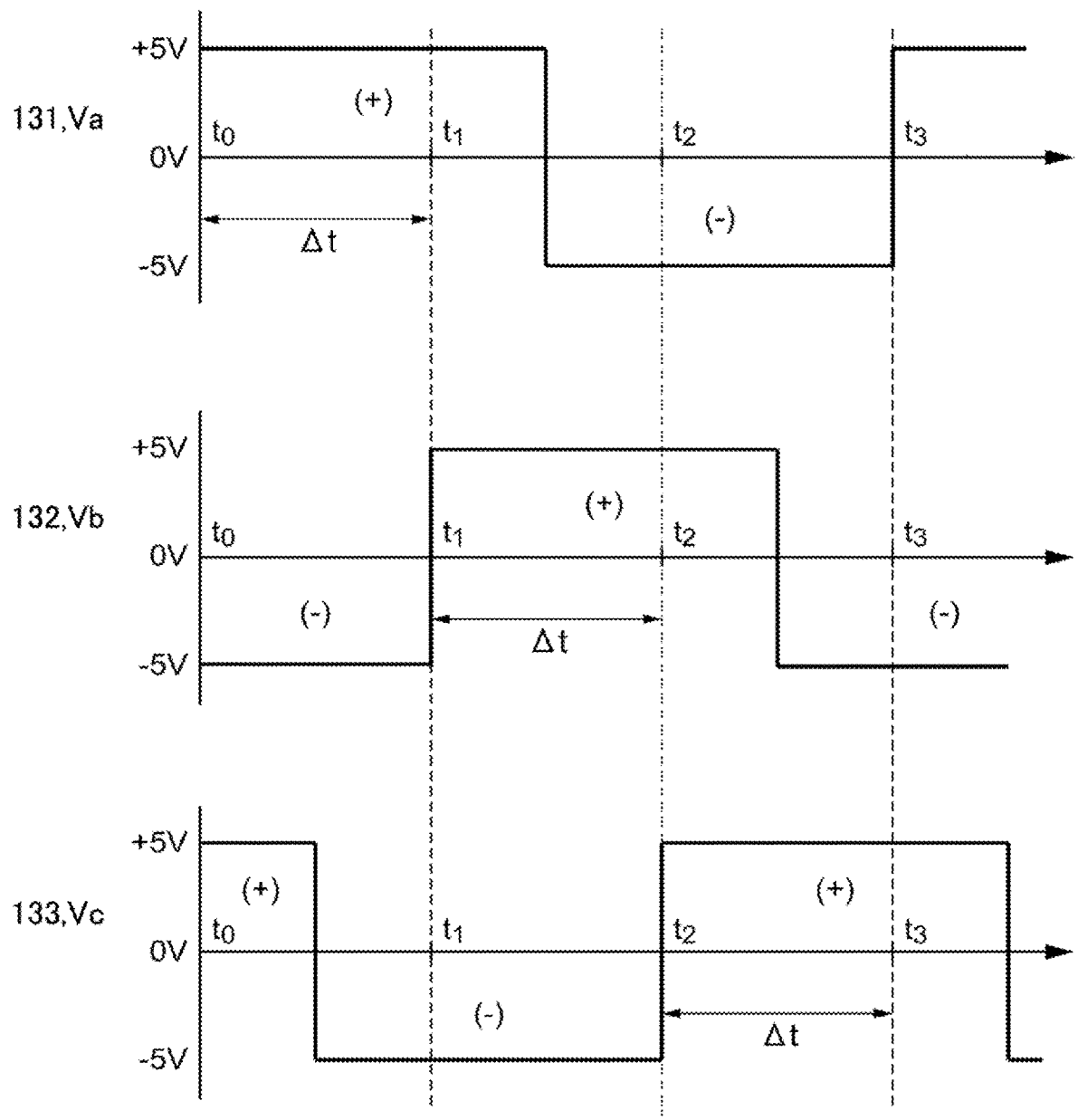
FIG. 7 is an explanatory diagram illustrating an example of a signal applied to the ion trap electrode illustrated in FIG. 5.

FIG. 7 is an explanatory diagram illustrating an example of a signal applied to the ion trap electrode 130 illustrated in FIG. 5. As illustrated in FIG. 5 and FIG. 6, as the ion trap electrode 130, a first ion trap electrode 131 and a second ion trap electrode 132 are provided on the first substrate 10 of the electro-optical device 100 according to the exemplary embodiment, the first ion trap electrode 131 is configured that a first signal Va is supplied to a region between the pixel region E and the sealing material 40 in plan view, and the second ion trap electrode 132 is configured that a second signal Vb having a different phase from the first signal Va is supplied to a region between the first electrode 131 and the sealing member 40 in plan view. In addition, a third electrode 133 is provided on the first substrate 10, the third electrode 133 is configured that a third signal Vc having a different phase from the first signal Va and the second signal Vb is supplied to a region between the second ion trap electrode 132 and the sealing material 40 in plan view. In the exemplary embodiment, the ion trap electrode 130 (the first ion trap electrode 131, the second ion trap electrode 132, and the third ion trap electrode 133) is formed of the same layer as the pixel electrode 15.

The ion trap electrode 130 (the first ion trap electrode 131, the second ion trap electrode 132, and the third ion trap electrode 133) is provided at least between the corner portion of the pixel region E where the ionic impurities are to be unevenly distributed and the corner portion of the sealing material 40. In the exemplary embodiment, corresponding to the diagonal deposition direction (The alignment direction of the liquid crystal molecules LC) illustrated by the arrow C1 and the arrow C2 in FIG. 1, the ion trap electrode 130 is provided at least between two corner portions Ea and Eb in the diagonal direction of the pixel region E and two corner portions 40a and 40b in the diagonal direction of the sealing material 40. Note that an aspect in which the ion trap electrode 130 extends from the two corner portions Ea and Eb along the pixel region E, or an aspect in which the ion trap electrode 130 extends in a frame shape over the entire periphery of the pixel region E including the two corner portions Ea and Eb may be adopted, but in the exemplary embodiment, the ion trap electrode 130 is provided only in the vicinity of at least two corner portions Ea and Eb in the diagonal direction of the pixel region E and two corner portions 40a and 40b in the diagonal direction of the sealing material 40.

In the exemplary embodiment, for example, as illustrated in FIG. 7, before the first signal Va supplied to the first ion trap electrode 131 transitions from the positive polarity (+) to the negative polarity (−), the second signal Vb supplied to the second ion trap 132 transitions from the negative polarity (−) to the positive polarity (+). Also, before the second signal Vb transitions from the positive polarity (+) to the negative polarity (−), the third signal Vc applied to the third ion trap 133 transitions from the negative polarity (−) to the positive polarity (+). Also, before the first signal Va applied to the first ion trap 131 transitions from the negative polarity (−) to the positive polarity (+), the second signal Vb applied to the second ion trap 132 transitions from the positive polarity (+) to the negative polarity (−). Also, before the second signal Vb transitions from the negative polarity (−) to the positive polarity (+), the third signal Vc applied to the third ion trap 133 transitions from the positive polarity (+) to the negative polarity (−).

Here, the second signal Vb provided to the second ion trap electrode 132 is provided to the first ion trap electrode 131, and is delayed with respect to the first signal Va by a Δt time in the time axis t. Similarly, the third signal Vc provided to the third ion trap electrode 133 is delayed with respect to the second signal Vb provided to the second ion trap electrode 132 by a Δt time at the time axis t. For example, assuming that the Δt time is 1/3 cycles, the alternating signals provided to each of the first ion trap electrode 131, the second ion trap electrode 132, and the third ion trap electrode 133 are shifted in phase by 1/3 cycles (120°) with each other. In other words, the maximum amount of phase shift Δt in which the potentials of the first ion trap electrode 131, the second ion trap electrode 132, and the third ion trap electrode 133 are shifted in phase with each other is a value obtained by dividing one cycle of the alternating signals by the number of electrodes n.

Note that signals illustrated in FIG. 7 are AC signals of the rectangular wave having a frequency of 1 mHz that transition between a high potential (5 V) and a low potential (−5 V) with a reference potential being 0 V, but the setting of the reference potential, the high potential, and the low potential is not limited to this example.

In the configuration described above, from the time t0 to the time t1 illustrated in FIG. 7, the second signal Vb supplied to the second ion trap electrode 132 adjacent to the first ion trap electrode 131 has a negative polarity of −5 V when the first signal Va supplied to the first ion trap electrode 131 is at a positive polarity (+) of 5 V. Thus, an electric field is generated from the first ion trap electrode 131 toward the second ion trap electrode 132 between the first ion trap electrode 131 and the second ion trap electrode 132. In addition, when the second signal Vb supplied to the second ion trap electrode 132 has the positive polarity (+) of 5 V in a period from the time t1 to the time t2, the third potential supplied to the third ion trap electrode 133 adjacent to the second ion trap electrode 132 has the negative polarity (−) of −5 V. Thus, an electric field is generated from the second ion trap electrode 132 toward the third ion trap electrode 133 between the second ion trap electrode 132 and the third ion trap electrode 133.

Furthermore, when the third signal Vc supplied to the third ion trap electrode 133 has the positive polarity (+) of 5 V in a period from the time t2 to the time t3, the second signal Vb supplied to the second ion trap electrode 132 adjacent to the third ion trap electrode 133 transitions from the positive polarity (+) of 5 V to the negative polarity (−) of −5. Thus, in a period of time corresponding to one cycle of the alternating signals from the time t0 to the time t3, the distribution of the electric field between the electrodes of the first ion trap electrode 131, the second ion trap electrode 132, and the third ion trap electrode 133 is scrolled in terms of time from the first ion trap electrode 131 to the third ion trap electrode 133.

Here, the ionic impurities having a positive polarity (+) may exist and the ionic impurities having a negative polarity (−) may exist, but in the exemplary embodiment, the ionic impurities of the positive polarity (+) or the negative polarity (−) are drawn to the first ion trap electrode 131 in response to the polarity of the first potential of the first ion trap electrode 131. If the ionic impurities that has been drawn to the first ion trap electrode 131 are retained there as they are, the ionic impurities gradually accumulate and may affect the electronic demarcation 120 and the display of the display region E1, thus, the ionic impurities that have been drawn to the first ion trap electrode 131 are sequentially moved to the second ion trap electrode 132 or the third ion trap electrode 133. In other words, this enables ionic impurities having a positive polarity (+) or negative polarity (−) drawn to the first ion trap electrode 131, to be transferred via the second ion trap electrode 132 to the third ion trap electrode 133. Therefore, the ionic impurities are swept from a dummy pixel region E2 to a peripheral region E3 in association with the movement of direction of electric field from the first ion trap electrode 131 to the third ion trap electrode 133. Such operations may be performed for either a period of time in which the image is displayed or a period of time during which the image is ceased to be displayed.

Note that, in order to ensure that the ionic impurities are swept to the third ion trap electrode 133 in association with the scrolling of the electric field, the frequency of the alternating signals are determined by taking into account the movement velocity of the ionic impurities. Note that the AC signals applied to the ion trap electrode 130 are not limited to the AC signals of the square wave illustrated in FIG. 7. For example, although the alternating signals of the square wave in FIG. 7 has the same time during which the electric potential is positive (+) and the electric potential is negative (−), but for example, the AC signal maybe set so that the time during which potential is negative (−) may be longer than the time during which the potential is positive (+). In addition, although the AC signal of the square wave may be amplitude between the two potentials of 5 V and −5 V, a waveform may be set so as to transition between different potentials of three or more values. Further, the alternating signals applied to each of the ion trap electrode may be sine waves having phases different from each other within one period of time.

Configuration of Diffusion Preventing Portion 27

In the embodiment, a diffusion preventing portion 27 in which the thickness of the electro-optical layer 50 is thinner than the thickness of the pixel region E is provided between the pixel electrode 15 and the first ion trap electrode 131. In other words, when the thickness of the electro-optical layer 50 in the pixel region E is referred as d0 and the thickness of the electro-optical layer 50 in the diffusion preventing portion 27 is referred as d1, the thicknesses d0 and d1 satisfy the following relationship.

$$d1<d0$$

For example, the thickness d0 of the electro-optical layer 50 in the pixel region E is 2.0 μm, and the thickness d1 of the electro-optical layer 50 in the diffusion preventing portion 27 is 1.0 μm.

In addition, the thickness d1 of the electro-optical layer 50 in the diffusion preventing portion 27 is equal to or greater than an interval d6 of the pixel electrode 15 and the first ion trap electrode 131 in plan view. In the embodiment, the thickness d1 of the electro-optical layer 50 in the diffusion preventing portion 27 is equal to the interval d6 of the pixel electrode 15 and the first ion trap electrode 131 in plan view, and the thickness d1 and the interval d6 are 1.0 μm.

Note that, in FIG. 5 and FIG. 6, the scale is different for each part, but the widths of the first ion trap electrode 131, the second ion trap electrode 132, and the third ion trap electrode 133 are, for example, 1.0 μm, and the distance between the electrodes is 1.0 μm. In addition, the interval between the pixel electrodes 15 is 0.6 μm.

In the embodiment, the diffusion preventing portion 27 is configured by a wall 270 protruding from one of the first substrate 10 and the second substrate 20 toward the other. In the embodiment, the wall 270 is formed of an insulating material such as a silicon oxide film protruding from the second substrate 20 toward the first substrate 10, and is provided on the side of the first substrate 10 with respect to the common electrode 23. In addition, the interval between the diffusion preventing portion 27 and the pixel electrode 15 in plan view is 0.5 µm. Therefore, even when the wall 270 is provided, a disturbance in the alignment direction of the liquid crystal in the electro-optical layer 50 is less likely to occur, so when the image is displayed, light leakage caused by the wall 270 is less likely to occur.

Main Effects of the Embodiment

As described above, in the embodiment, since the first ion trap electrode 131, the second ion trap electrode 132, and the third ion trap electrode 133 are provided with signals whose phases are shifted by 120° from each other are applied, the negative ionic impurities and the positive ionic impurities mixed into the electro-optical layer 50 of the pixel region E including the display region E1 can be swept out to a region separated from the pixel region E. Therefore, the reduction in image quality due to the uneven distribution of the ionic impurities in the pixel region E can be suppressed.

In addition, since the diffusion preventing portion 27 is provided in a position between the pixel electrode 15 and the first ion trap electrode 131 such that the thickness of the electro-optic layer 50 in the position is thinner than that in the pixel region E, when the application of the potential to the ion trap 130 is paused, the high-concentration ionic impurities condensed near the ion trap 130 are less likely to diffuse into the pixel region E even if a concentration gradient exists.

In addition, since the thickness d1 of the electro-optical layer 50 in the diffusion preventing portion 27 is equal to or greater than the interval d6 of the pixel electrode 15 and the first ion trap electrode 131 in plan view, the negative ionic impurities and the positive ionic impurities mixed into the electro-optical layer 50 of the pixel region E can be efficiently swept to the region separated from the pixel region E by the first ion trap electrode 131, the second ion trap electrode 132 and the third ion trap electrode 133.

In addition, while the first ion trap electrode 131, the second ion trap electrode 132, and the third ion trap electrode 133 are provided on the first substrate 10, the diffusion preventing portion 27 is configured by the wall 270 protruding from the side of the second substrate 20 toward the side of the first substrate 20. Therefore, when the negative ionic impurities and the positive ionic impurities mixed into the electro-optical layer 50 of the pixel region E are efficiently swept to the outer side of the pixel region E by the first ion trap electrode 131, the second ion trap electrode 132 and the third ion trap electrode 133, the diffusion preventing portion 27 (the wall 270) is less likely to act as a barrier. Thus, the negative ionic impurities and the positive ionic impurities mixed into the electro-optical layer 50 of the pixel region E can be efficiently swept to the region separated from the pixel region E.

Second Exemplary Embodiment

Figure 8:
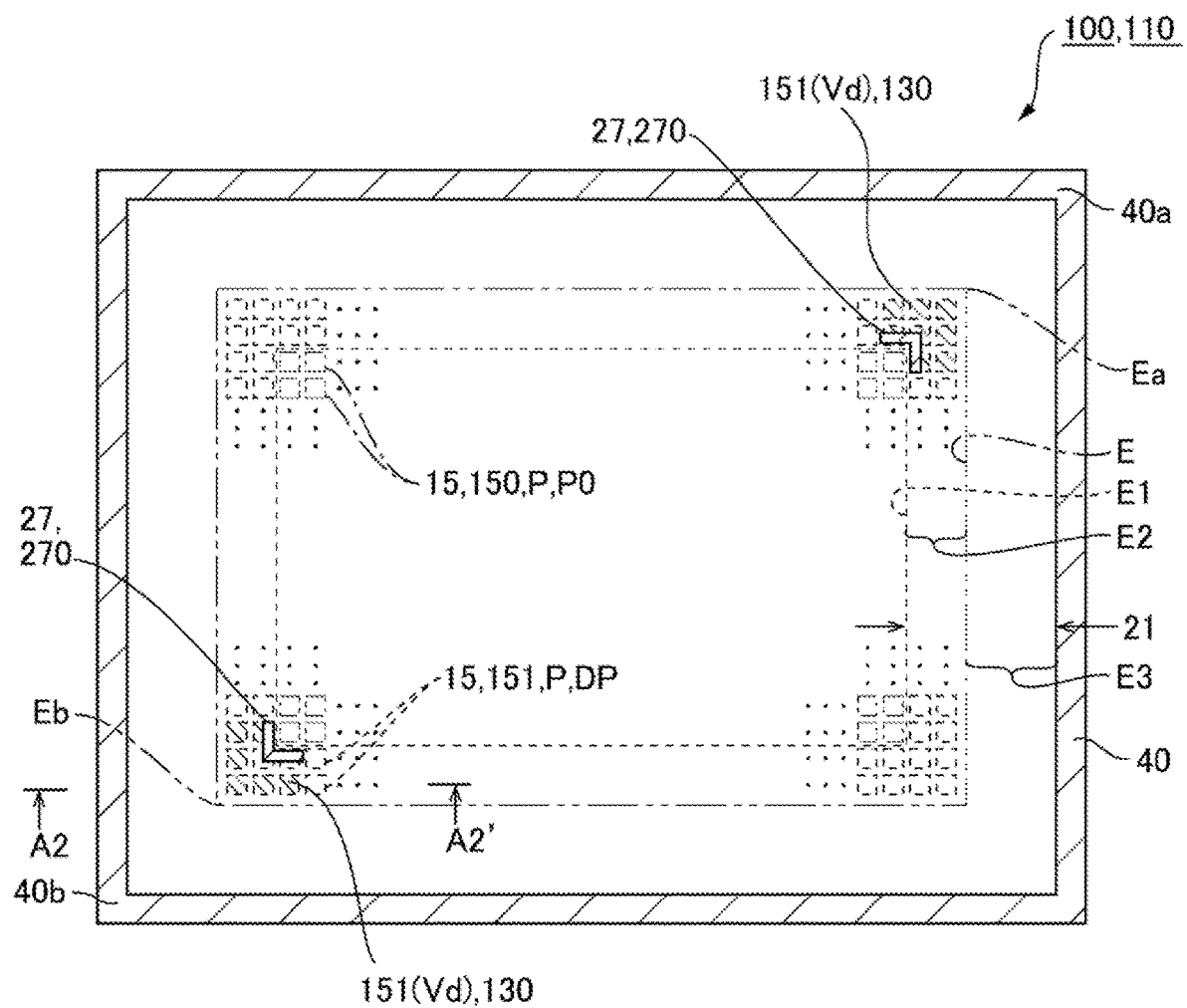
FIG. 8 is an explanatory diagram illustrating a planar configuration of the electro-optical device according to exemplary embodiment 2 of the present disclosure.
Figure 9:
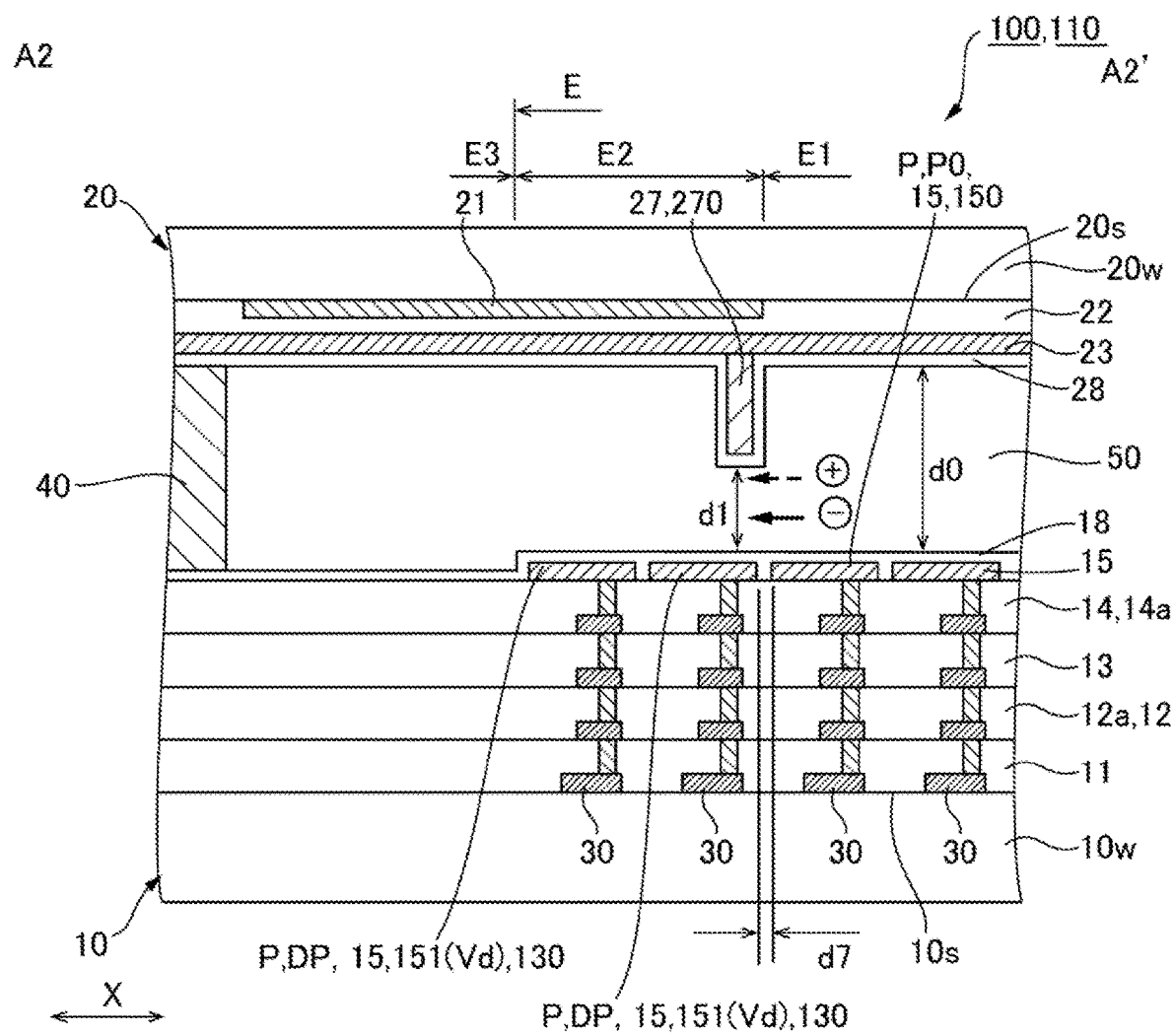
FIG. 9 is an explanatory diagram schematically illustrating an A2-A2' cross-section of the electro-optical device illustrated in FIG. 8.

FIG. 8 is an explanatory diagram illustrating a planar configuration of the electro-optical device 100 according to exemplary embodiment 2 of the present disclosure, and is an explanatory diagram of the region where the first substrate 10 and the second substrate 20 overlap. FIG. 9 is an explanatory diagram schematically illustrating an A2-A2' cross-section of the electro-optical device 100 illustrated in FIG. 8. Note that, basic configurations in this exemplary embodiment are similar to those in Exemplary Embodiment 1, and thus, common portions are assigned identical reference signs and a detailed description thereof will be omitted.

As illustrated in FIG. 8 and FIG. 9, in the embodiment, at least a part of the pixel electrode 15 (dummy pixel electrode 151) provided in each dummy pixel DP of the dummy pixel region E2 is used as the ion trap electrode 130 to which the ion trapping signal Vd having a phase different from the image signal applied to the image display pixel electrode 150 is applied. Thus, the demarcation portion 21 overlaps with the dummy pixel region E2. In the embodiment, when the common potential applied to the common electrode 23 is used as a reference, the ion trap signal Vd is, for example, an AC signal of the rectangular wave having an amplitude of ±5 V and a frequency of 1 mHz.

In the embodiment, the ion trap electrode 130 is configured that at least the dummy pixel electrodes 151 located at the corner portions Ea and Eb of the pixel region E in which the ionic impurities are to be unevenly distributed among the plurality of dummy pixel electrodes 151 in the dummy pixel region E2 are used as the ion trap electrode 130. Note that an aspect in which the ion trap electrode 130 extends from the two corner portions Ea and Eb along the pixel region E, or an aspect in which the ion trap electrode 130 extends in a frame shape over the entire periphery of the pixel region E including the two corner portions Ea and Eb may be adopted. In the embodiment, the ion trap electrode 130 is provided only in the vicinity of the two corner portions Ea and Eb in the diagonal direction of the pixel region E. In addition, since the ion trap electrode 130 is a plurality of dummy pixel electrodes 151 in the dummy pixel region E2, the demarcation portion 21 overlaps with the dummy pixel region E2.

According to this configuration, the horizontal electric field can be generated at a position near the display region E1 by the ion trap electrode 130, thus the negative ionic impurities and the positive ionic impurities mixed into the electro-optical layer 50 of the display region E1 can be swept out to the dummy pixel region E2. Therefore, the reduction of image quality due to the uneven distribution of the ionic impurities in the display region E1 can be suppressed.

In addition, on the first substrate 10, the diffusion preventing portion 27 is provided in a position between the image display pixel electrode 150 and the dummy pixel electrode 151 which is used as the ion trap electrode 130 such that the thickness of the electro-optical layer 50 in the position is thinner than that in the region where the electrode-optical layer overlaps the image display pixel electrode 150. The diffusion preventing portion 27 is configured by the wall 270 protruding from one of the first substrate 10 and the second substrate 20 toward the other. In the embodiment, the wall 270 is formed of an insulating material such as a silicon oxide film protruding from the second substrate 20 toward the first substrate 10. A part of the diffusion preventing portion 27 overlaps with the dummy pixel electrode 151 which is used as the ion trap electrode 130.

Here, when the thickness of the electro-optical layer 50 in a region overlapping with the image display pixel electrode 150 is referred as d0 and the thickness of the electro-optical layer 50 in the diffusion preventing portion 27 is referred as d1, the thicknesses d0 and d1 satisfy the following relationship.

$$d1<d0$$

For example, the thickness d0 of the electro-optical layer 50 in the region overlapping with the image display pixel electrode 150 is approximately 2.0 μm, and the thickness d1 of the electro-optical layer 50 in the diffusion preventing portion 27 is 1.0 μm.

In the embodiment, the thickness d1 of the electro-optical layer 50 in the region overlapping with the image display pixel electrode 150 is equal to or greater than the interval d7 of the image display pixel electrode 150 and the ion trap electrode 130 in plan view. In the embodiment, the thickness d1 of the electro-optical layer 50 in the diffusion preventing portion 27 is 1.0 μm, while the interval d7 of the image display pixel electrode 150 and the ion trap electrode 130 in plan view is 0.6 μm, the thickness d1 of the electro-optical layer 50 in the diffusion preventing portion 27 is thicker than the interval d7 of the image display pixel electrode 150 and the ion trap electrode 130 in plan view.

According to this aspect, when the application of the potential to the ion trap 130 is paused, the high-concentration ionic impurities condensed near the ion trap 130 is less likely to diffuse into the display region E1 because the movement is suppressed by the diffusion preventing portion 27 even if there is a concentration gradient. In addition, since the thickness d1 of the electro-optical layer 50 in the diffusion preventing section 27 is equal to or greater than the interval d7 of the pixel electrode 15 and the ion trapping electrode 130 in plan view, the negative ionic impurities and the positive ionic impurities in the display region E1 can be efficiently swept to the dummy pixel region E2. In addition, while the ion trap electrode 130 is provided on the first substrate 10, the diffusion preventing portion 27 is configured by the wall 270 protruding from a side of the second substrate 20 toward a side of the first substrate 20. Thus, the negative ionic impurities and the positive ionic impurities can be efficiently swept from the display region E1 to the dummy pixel region E2 by the ion trap electrode 130.

In the embodiment, a part of the diffusion preventing portion 27 overlaps with the dummy pixel electrode 151 which is used as the ion trap electrode 130, and the interval between the diffusion preventing portion 27 and the image display pixel electrode 150 is 0.5 μm. Therefore, even when the wall 270 is provided, a disturbance in the alignment direction of the liquid crystal in the electro-optical layer 50 is less likely to occur. Therefore, when an image is displayed, light leakage caused by the wall 270 is less likely to occur.

Embodiment 3

Figure 10:
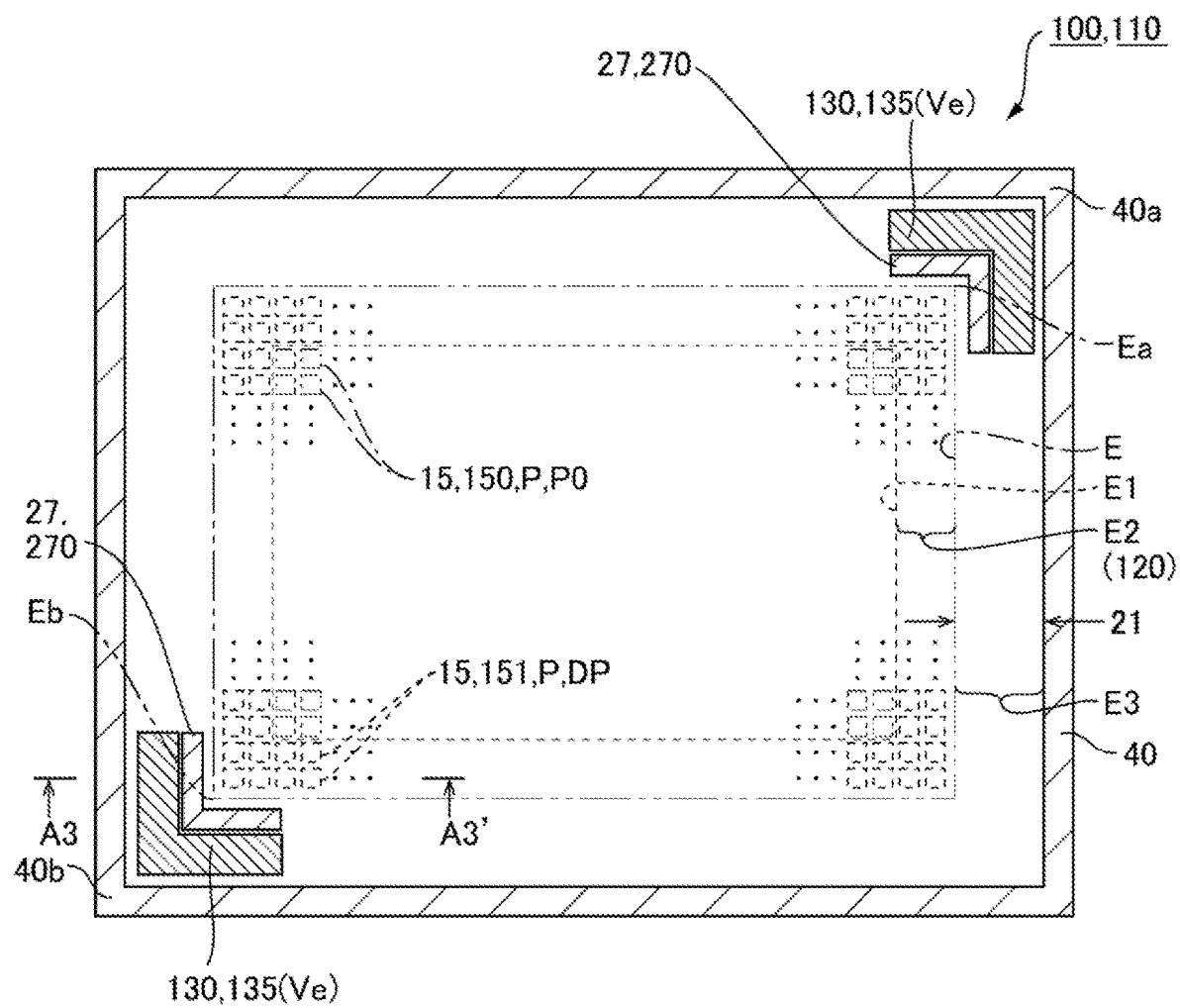
FIG. 10 is an explanatory diagram illustrating a planar configuration of the electro-optical device according to exemplary embodiment 3 of the present disclosure.
Figure 11:
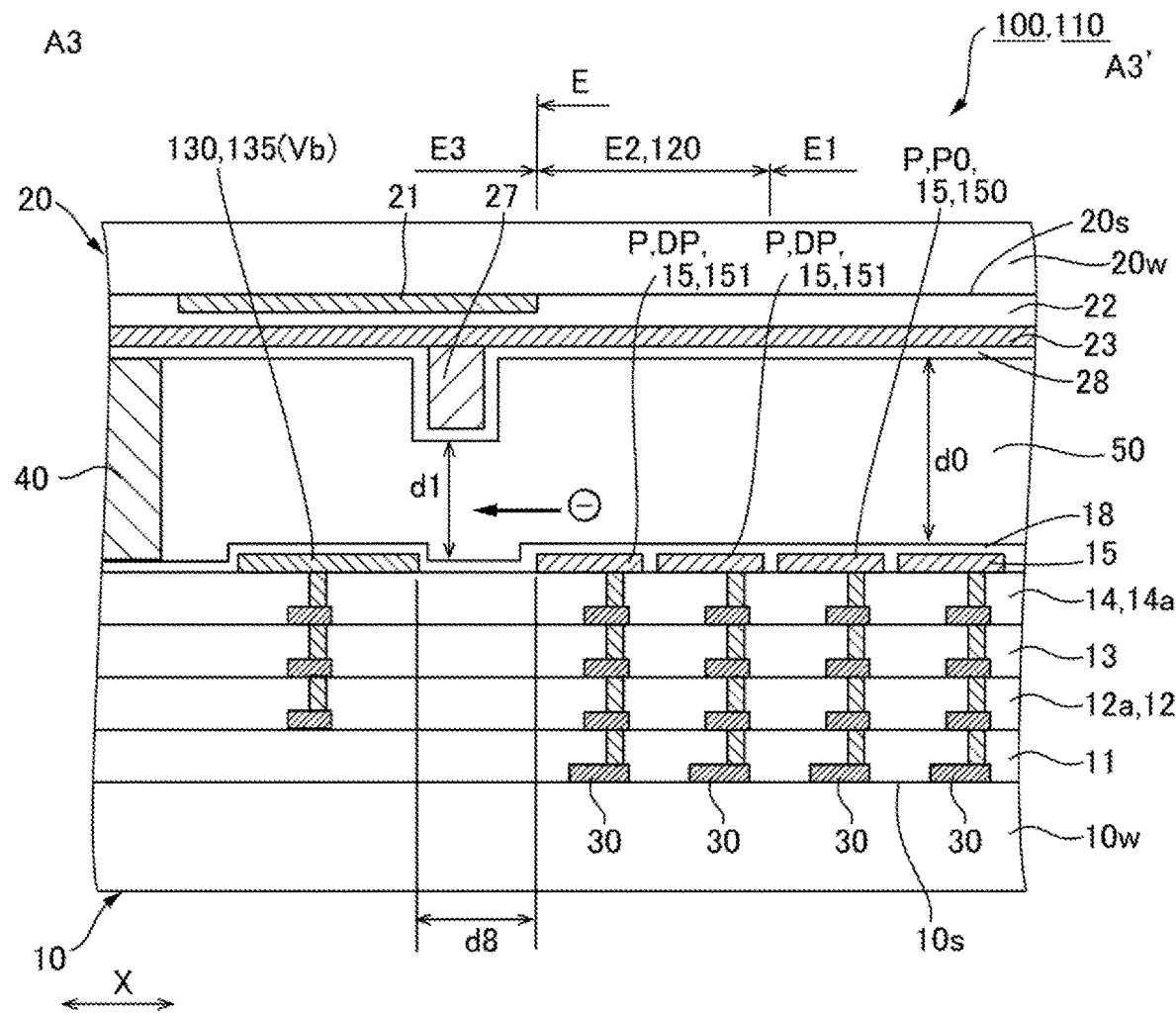
FIG. 11 is an explanatory diagram schematically illustrating an A3-A3' cross-section of the electro-optical device illustrated in FIG. 10.

FIG. 10 is an explanatory diagram illustrating a planar configuration of the electro-optical device 100 according to exemplary embodiment 3 of the present disclosure, and is an explanatory diagram of the region where the first substrate 10 and the second substrate 20 overlap. FIG. 11 is an explanatory diagram schematically illustrating an A3-A3' cross-section of the electro-optical device 100 illustrated in FIG. 10. Note that, basic configurations in this exemplary embodiment are similar to those in Exemplary Embodiment 1, and thus, common portions are assigned identical reference signs and a detailed description thereof will be omitted.

As illustrated in FIG. 10 and FIG. 11, in the embodiment, the ion trap electrode 130 to which an ion trapping potential Ve is applied is provided between the pixel region E of the first substrate and the sealing material 40. In the embodiment, the ion trap electrode 130 is for example, an electrode 135 to which a DC voltage of +5 V is applied. In the embodiment, the ion trap electrode 130 (electrode 135) is formed of the same layer as the pixel electrode 15.

According to this configuration, the negative ionic impurities mixed into the electro-optical layer 50 of the display region E1 can be swept to the outer side of the pixel region E by the ion trap electrode 130. Therefore, the reduction of image quality due to the uneven distribution of the ionic impurities in the display region E1 can be suppressed.

In addition, on the first substrate 10, the diffusion preventing portion 27 in which the thickness of the electro-optical layer 50 is thinner than the thickness of the pixel region E is provided between the ion trap electrode 130 and the pixel electrode 15. In the embodiment, the diffusion preventing prevention portion 27 is configured by the wall 270 protruding from one of the first substrate 10 and the second substrate 20 toward the other. In the embodiment, the wall 270 is formed of an insulating material such as a silicon oxide film protruding from the second substrate 20 toward the first substrate 10.

Here, when the thickness of the electro-optical layer 50 in the pixel region E is referred as d0 and the thickness of the electro-optical layer 50 in the diffusion preventing portion 27 is referred as d1, the thicknesses d0 and d1 satisfy the following relationship.

$$d1 < d0$$

For example, the thickness d0 of the electro-optical layer 50 in the region overlapping with the image display pixel electrode 150 is approximately 2.0 μm, and the thickness d1 of the electro-optical layer 50 in the diffusion preventing portion 27 is 1.0 μm.

In addition, the thickness d1 of the electro-optical layer 50 on the diffusion preventing portion 27 is equal to or greater than an interval d8 of the pixel electrode 15 and the ion trap electrode 130 (electrode 135) in plan view. In the embodiment, the thickness d1 of the electro-optical layer 50 on the diffusion preventing portion 27 is 1.0 μm, while the interval d8 of the pixel electrode 15 and the ion trap electrode 130 in plan view is 1.0 μm, the thickness d1 of the electro-optical layer 50 on the diffusion preventing portion 27 is equal to the interval d8 between the pixel electrode 15 and the ion trap electrode 130 in plan view.

According to this aspect, when the application of the potential to the ion trap 130 is paused, the high-concentration ionic impurities condensed near the ion trap 130 is less likely to diffuse into the display region E1 because the movement is suppressed by the diffusion preventing portion 27 even if there is a concentration gradient. In addition, the thickness d1 of the electro-optical layer 50 on the diffusion preventing portion 27 is equal to or greater than the interval d8 of the pixel electrode 15 and the ion trapping electrode 130 in plan view, the negative ionic impurities in the display region E1 can be efficiently swept to the outer side of the pixel region E. In addition, while the ion trap electrode 130 is provided on the first substrate 10, the diffusion preventing portion 27 is configured by the wall 270 protruding from a side of the second substrate 20 toward a side of the first substrate 20. Thus, the negative ionic impurities in the display region E1 can be swept from the display region E1 to the outer side of the pixel region E by the ion trap electrode 130.

Other Exemplary Embodiments

In the electro-optical device 100 according to the exemplary embodiments 1 and 3 described above, the dummy pixel region E2 is provided between the demarcation portion 21 and the display region E1, but the present disclosure may be applied in a case that the dummy pixel region E2 overlaps with the demarcation portion 21 in plan view. The present disclosure may also be applied in a case that the dummy pixel region E2 is not provided between the demarcation portion 21 and the display region E1.

In the exemplary embodiment described above, the pixel electrode 15 is formed on the first substrate 10 and the common electrode 23 is formed on the second substrate 20, but the present disclosure may also be applied in a case that the common electrode 23 is formed on the first substrate 10 and the pixel electrode 15 is formed on the second substrate 20. In addition, the present disclosure may also be applied in a case that both the pixel electrode 15 and the common electrode 23 are formed on the first substrate 10 or the second substrate 20.

In the exemplary embodiment described above, although the present disclosure is applied to the transmissive electro-optical device 100, the present disclosure may also be applied to a reflective electro-optical device 100.

Installation Example to Electronic Apparatus

Figure 12:
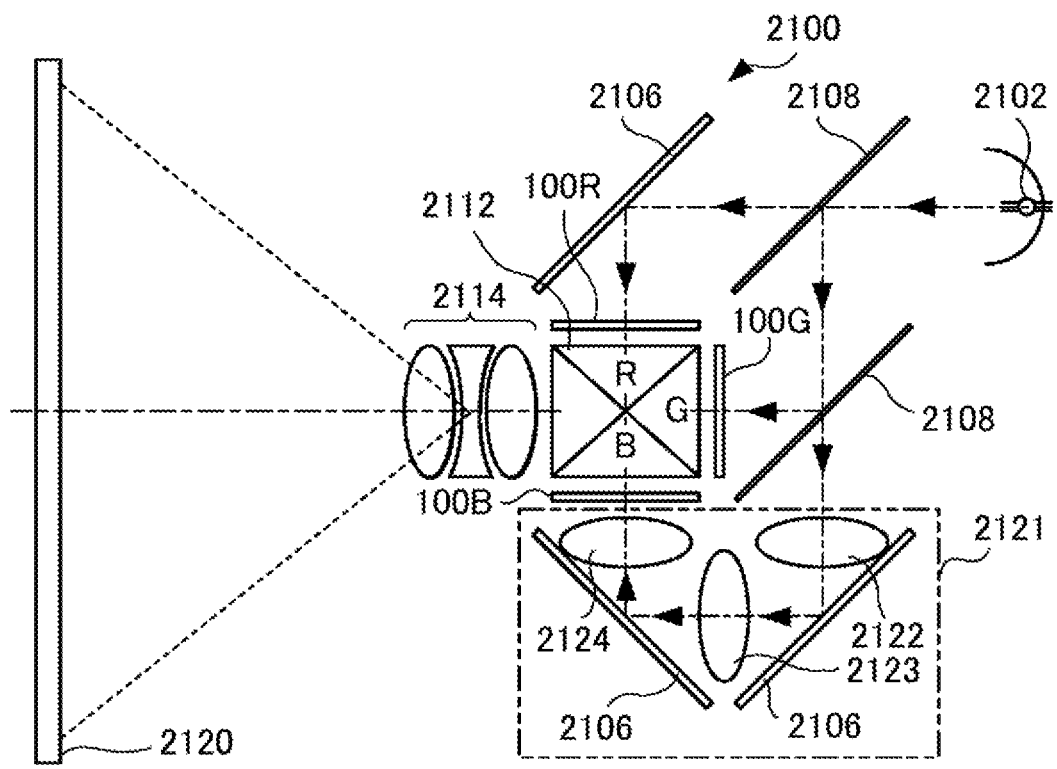
FIG. 12 is a schematic configuration view of a projection-type display device using the electro-optical device to which the disclosure is applied.

An electronic apparatus using the electro-optical device 100 according to the above-described exemplary embodiments will be described below. FIG. 12 is a schematic configuration view of a projection-type display device using the electro-optical device 100 to which the disclosure is applied. Optical element such as a polarizing plate is not illustrated in FIG. 12. The projection-type display apparatus 2100 illustrated in FIG. 12 is an example of an electronic apparatus using the electro-optical device 100.

The projection-type display device 2100 illustrated in FIG. 12, in which the electro-optical device 100 according to the exemplary embodiment described above is used as a light valve, can conduct high-definition and bright display without making the apparatus large. As illustrated in FIG. 12, a lamp unit 2102 (light source unit) with a white light source such as a halogen lamp is provided inside the projection-type display apparatus 2100. Projection light emitted from the lamp unit 2102 is split into three primary colors of R (red), G (green), and B (blue) by three mirrors 2106 and two dichroic mirrors 2108 installed inside. The split projection light is guided to light valves 100R, 100G, and 100B corresponding to the primary colors, respectively and modulated. Note that since the light of the B color has a long optical path as compared to the other light of the R color and the G color, the light of the B color is guided via a relay lens system 2121 including an incidence lens 2122, a relay lens 2123, and an emission lens 2124 to prevent a loss due to the long optical path of the light of the B color.

The light modulated by each of the light valves 100R, 100G, and 100B is incident on a dichroic prism 2112 from three directions. Then, at the dichroic prism 2112, the light of the R color and the light of the B color are reflected at 90 degrees, and the light of the G color is transmitted. Accordingly, an image of the primary colors are synthesized, and subsequently a color image is projected on a screen 2120 by a projection lens group 2114 (projection optical system).

Other Projection-Type Display Apparatuses

Note that the projection-type display apparatus may include a configuration in which an LED light source or the like configured to emit light of each color is used as a light source unit and the light of each color emitted from the LED light source is supplied to another liquid-crystal device.

Other Electronic Apparatuses

The electronic apparatus including the electro-optical device 100 to which the present disclosure is applied is not limited to the projection-type display device 2100 of the above-described exemplary embodiment. Examples of the electronic apparatus may include a projection-type head up display (HUD), a direct-view-type head mounted display (HMD), a personal computer, a digital still camera, and a liquid crystal television.

What is claimed is:

1. An electro-optical device comprising:
   a first substrate;
   a sealing material;
   a second substrate bonded to the first substrate via the sealing material;
   an electro-optical layer disposed on an inner side of the sealing material;
   a pixel electrode provided in a pixel region of one of the first substrate and the second substrate;
   a first ion trap electrode provided between the pixel region of the first substrate and the sealing material, the first ion trap electrode being applied with a first signal; and
   a second ion trap electrode provided between the first ion trap electrode of the first substrate and the sealing material, the second ion trap electrode being applied with a second signal having a phase different from that of the first signal, wherein
   a diffusion preventing portion is provided in a position between the pixel electrode and the first ion trap electrode such that a thickness of the electro-optical layer in the position is thinner than that in the pixel region.

2. The electro-optical device according to claim 1, comprising a third ion trap electrode provided between the second ion trap electrode of the first substrate and the sealing material, the third ion trap electrode being applied with a third signal having a phase different from that of the second signal, wherein
   phases of the first signal, the second signal, and the third signal are shifted by 120° from each other.

3. The electro-optical device according to claim 1, wherein the thickness of the electro-optical layer, where the diffusion preventing portion is provided, is equal to or greater than an interval between the pixel electrode and the first ion trap electrode in plan view.

4. An electro-optical device comprising:
   a first substrate;
   a sealing material;
   a second substrate bonded to the first substrate via the sealing material;
   an electro-optical layer disposed on an inner side of the sealing material; and
   a plurality of pixel electrodes provided in a pixel region of one of the first substrate and the second substrate, wherein
   the plurality of pixel electrodes include an image display pixel electrode and an ion trap electrode, the image display pixel electrode being applied with an image signal for displaying an image, and the ion trap electrode being applied with an ion trap signal having a phase different from that of the image signal,
   a diffusion preventing portion is provided in a position between the image display pixel electrode and the ion trap electrode such that a thickness of the electro-optical layer in the position is thinner than that in a region where the electro-optical layer overlaps the image display pixel electrode.

5. The electro-optical device according to claim 4, wherein the thickness of the electro-optical layer, where the diffusion preventing portion is provided, is equal to or greater than an interval between the image display pixel electrode and the ion trap electrode in plan view.

6. An electro-optical device comprising:
a first substrate;
a sealing material;
a second substrate bonded to the first substrate via the sealing material;
an electro-optical layer disposed on an inner side of the sealing material;
a pixel electrode provided in a pixel region of one of the first substrate and the second substrate; and
an ion trap electrode provided between the pixel region of the first substrate and the sealing material, the ion trap electrode being applied with an ion trap potential, wherein
a diffusion preventing portion is provided in a position between the pixel electrode and the ion trap electrode such that a thickness of the electro-optical layer in the position is thinner than that in the pixel region and thicker than an interval between the pixel electrode and the ion trap electrode in plan view.

7. The electro-optical device according to claim 1, wherein the diffusion preventing portion is configured by a wall protruding from one of the first substrate and the second substrate toward the other.

8. The electro-optical device according to claim 7, wherein the wall protrudes from the second substrate toward the first substrate.

9. An electronic apparatus comprising the electro-optical device according to claim 1.

* * * * *